Aug. 26, 1958 R. T. BURNETT 2,849,088
BRAKE ACTUATOR
Filed Feb. 4, 1955 2 Sheets-Sheet 1
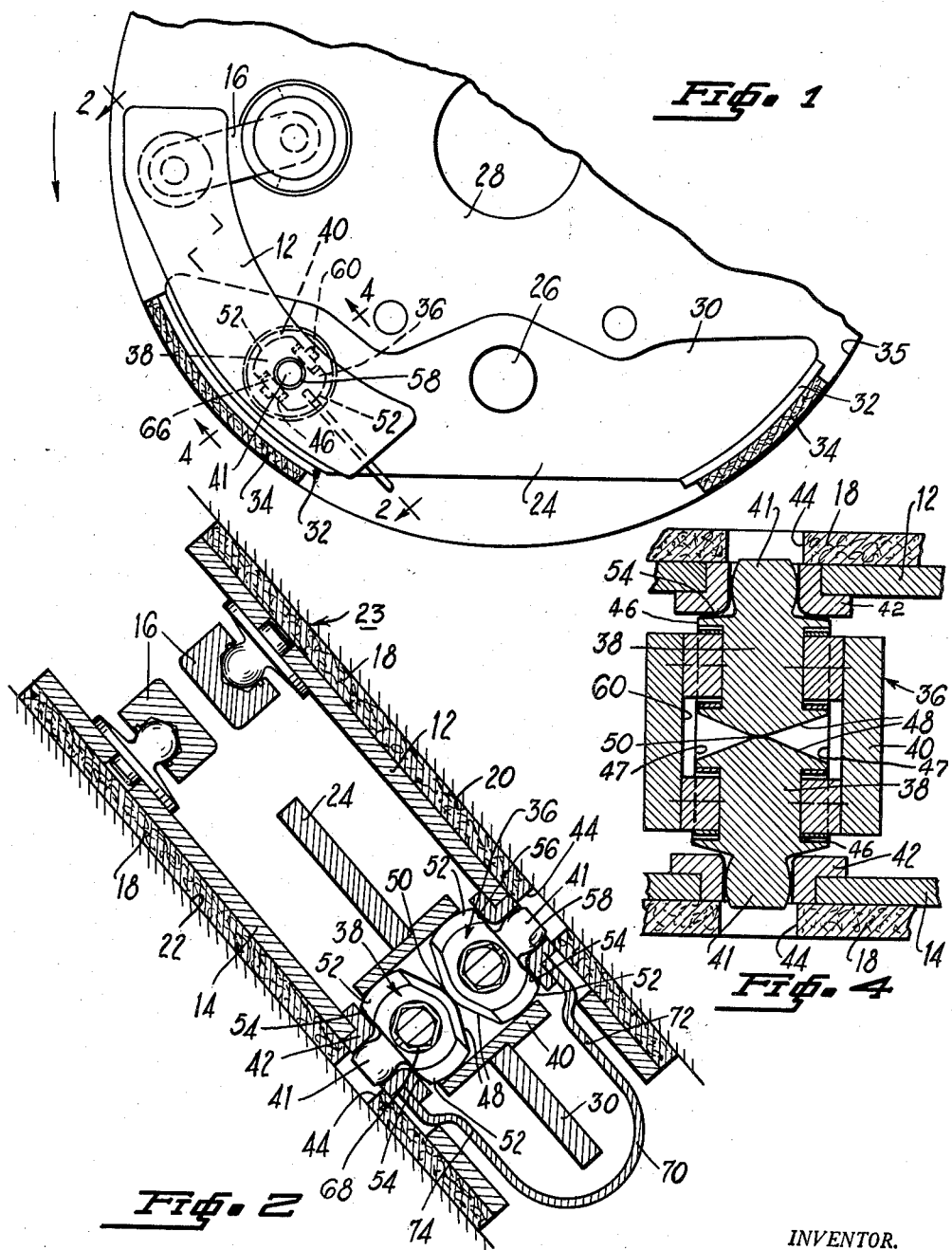
INVENTOR.
RICHARD T. BURNETT
BY John A. Young
ATTORNEY

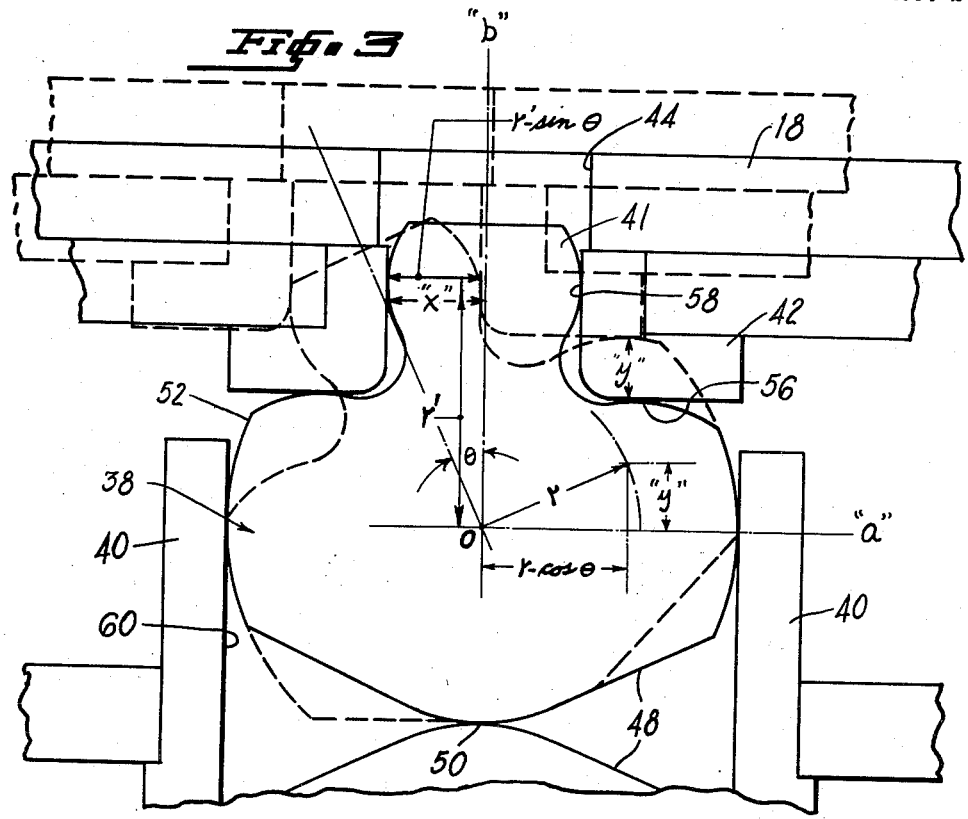
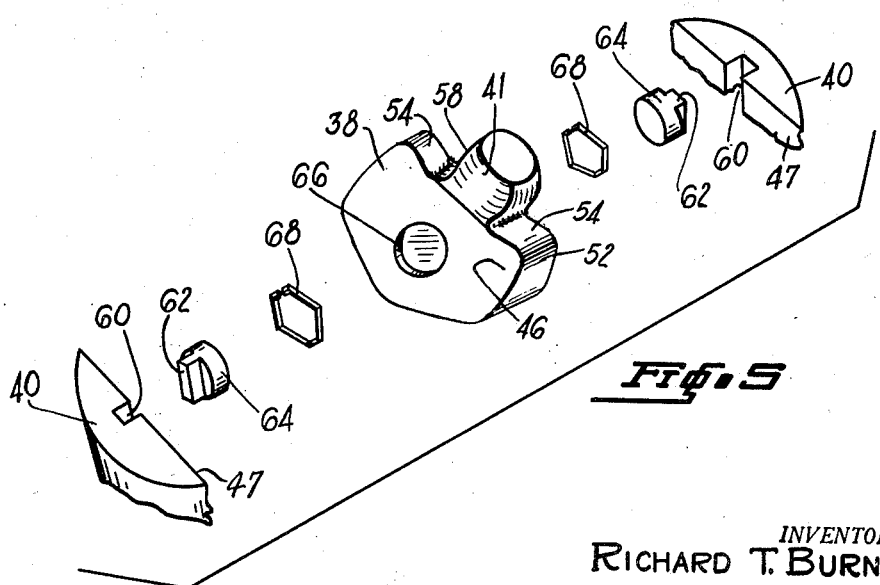

United States Patent Office 2,849,088
Patented Aug. 26, 1958

2,849,088

BRAKE ACTUATOR

Richard T. Burnett, South Bend, Ind., assignor to Bendix Aviation Corporation, South Bend, Ind., a corporation of Delaware Application February 4, 1955, Serial No. 486,184

11 Claims. (Cl. 188—70)

This invention relates to a brake applying mechanism and more specifically to a camming device which is incorporated into a brake system to provide self-energization for the brake.

To increase the effectiveness of brakes, there is often provided means for producing self-energization in the brake. Self-energization means that part of the developed braking torque which is utilized as applying effort for the brake. Thus, in addition to the force which is supplied by the operator, the brake itself generates a part of the force used in its application. The net result is that the applying effort of the operator is multiplied and this reduces the order of input force required to accomplish a given deceleration rate.

Self-energization is relatively easy to obtain with arcuate shoe brakes because of the design of the brake shoe. On the other hand, it is more difficult to obtain self-energization with disk brakes because the friction components are "flat" members. This design of the friction element does not lend itself to self-energization by the inherent design thereof and therefore self-energization must be supplied by additional means. In providing self-energization for the "disk" type brake there have been constructed "ball-ramp" camming devices. While the "ball-ramp" camming devices have been satisfactory in many instances, I find that they are generally inadequate insofar as brake noise is concerned. They are very prone to making objectionable, audible sounds when the brake has worn considerably and successive braking stops are made in forward and then reverse vehicle movement. A further deficiency of the "ball-ramp" camming device is the inherent difficulty encountered in providing an automatic adjustor for the friction elements with which such camming devices are combined. It is also somewhat of a problem to obtain an exact degree of self-energization without incurring considerable manufacturing expense. I have found that the ramp angle in these "ball-ramp" devices is quite critical, and forming the ramp angle to the correct dimension is an expensive operation.

According to these foregoing remarks, it is my aim to supply a new cam and camming arrangement which will provide self-energization for disk brake elements at a lower cost and with superior performance features.

One of the objects of the invention is to effect self-energization of a brake by cam elements which are characterized by turning as distinguished from rolling movement.

Another object of the invention is to utilize camming devices as elements in an automatic adjusting means. It is my object to construct the cams in such a manner that functioning of the cams for self-energization is combined with the further functioning of the cams as adjusting means.

Another object of the invention is to obtain controllable self-energization so that retarding effort on the vehicle is substantially constantly proportional to input force exerted by the operator.

One of the principal objects of this invention is to improve upon prior camming devices for disk brakes by simplifying the construction of the camming device to thereby render it more economical to manufacture and more convenient to assemble and service.

A further object of the invention is to reduce brake noise. It is the aim of this invention to minimize noises which accompany application of a self-energizing brake; this problem of noise is particularly acute when lining wear has progressed, causing greater clearance between the engageable surfaces of the brake.

A feature of the invention is that force is transmitted through the camming devices so that applying effort for one friction element is supplied by torque developed through application of a second friction element.

Other objects and features of the invention will become apparent as the description progresses with reference to the accompanying drawings in which:

Figure 1 is a fragmentary side elevation view of a brake showing a brake unit provided with the invention;

Figure 2 is a section view taken on line 2—2 of Figure 1;

Figure 3 is an enlarged fragmentary section view taken through the center of the cams and showing the cams in two different angular positions;

Figure 4 is a section view taken on the line 4—4 of Figure 1; and

Figure 5 is an exploded view showing a cam, bearing, and adjustor assembly.

Referring to Figures 1 and 2, friction elements 12 and 14 are thrust apart by articulated levers 16, thus bringing lining 18 into forcible engagement with spaced sides 20 and 22 of a U-shaped cross-section rotor 23. A second friction element 24 is pivotally mounted on an anchor 26 which is fastened to a support member 28, the support member being attached in any suitable manner to a fixed part of the vehicle as for example an axle flange (not shown). For details of the lever construction, rotor and friction element, reference should be made to my copending applications, No. 434,846, filed June 7, 1954; No. 433,609, filed June 1, 1954; and application No. 476,170, filed December 20, 1954. The friction element 24 includes a web 30 having an arcuate rim segment 32 at each of the opposite ends thereof. Friction material lining 34 is secured to the rim 32 and is engageable with a cylindrical surface 35 of the rotor when friction element 24 is caused to pivot about the anchor 26.

A camming mechanism, designated generally by reference numeral 36, assists in spreading apart the friction elements 12 and 14, or "flat shoes" as they are sometimes referred to. The mechanism 36 includes two identical cams 38 which are turnably mounted in a bearing 40 that is fixed in the web 30. Each cam is provided with a boss 41 which extends through a bushing 42 and into a hole 44 in the lining 18. Flats 46 are formed on opposite sides of cams 38 and flats 47 are formed on opposite sides of bearing 40 to insure turning of the cam about a single axis. Cam surfaces 48 are rounded and have a point contact 50 therebetween. Cam surfaces 52 are rounded to facilitate turning of the cam 38 within the bearing and rolling of the two cams on their engageable surfaces 48.

A shoulder 54 is formed between the body of the cam and the boss 41. (Figures 4 and 5.) This shoulder 54 engages the bushing 42 and exerts an applying thrust on the disk elements when the cam is turned within the bearing. The surface 56 of the shoulder 54 and the annular cam surface 58 on the boss are curved, with the centers of curvature located on horizontal and vertical axes "a" and "b," respectively, (shown in Figure 3).

It forms an important part of the present invention that self-energization for the "flat" shoes, which is produced by the cams, is nearly constant throughout the wear life of the brake. Qualitatively, this means that for a given transverse movement of the disk or "flat" shoe friction element 12 (movement either to the right or to the left in Figure 3) there will result a given vertical displacement of the disk or "flat" shoe friction element (up or down movement as shown in Figure 3). This can be expressed mathematically in the following manner: "x" designates transverse displacement of friction element 14, "y" designates vertical displacement of the friction element resulting from cam action. The ratio of $x$ to $y$ is a constant and this can be demonstrated in the following manner. The transverse movement "x" and the vertical displacement "y" are proportional to the radii $r'$ and $r$ which represent the distances from neutral point "o" to the centers of curvature surfaces 58 and 56, when the cams are in the position shown in full lines in Figure 3. Assume that the cam is rotated counterclockwise to a position indicated by the dotted lines in Figure 3. This angular movement may be represented by the angle $\theta$. It will be noted that the vertical lever arm $r'$ in the new angular position is foreshortened so that it now equals $r'$ cosine $\theta$; the horizontal lever arm previously equal to the distance "r" is foreshortened so that it now equals the distance $r$ cosine $\theta$. It will be seen that the ratio $$\frac{x}{y}$$

is equal to $$\frac{r' \text{ sine } \theta}{r \text{ sine } \theta}$$

or $$\frac{r'}{r}$$

which is a constant. Since the foreshortening of the horizontal and vertical lever arms will always be modified to the same extent by the angle through which the cam is rotated, then the ratio of vertical displacement of the friction element to horizontal displacement will remain a constant regardless of the extent of horizontal displacement of the friction element.

This characteristic of the cam is obtained because the centers of curvature of the cam surfaces 56 and 58 are located on axes "a" and "b" which are perpendicular to each other and intersect on the axis of rotation of the cam. Since the location of the centers of curvature is related to the axis of rotation of the cam, it is necessary that the axis of rotation remain constant for all cam positions. This is provided for by rounding the cam surfaces 48 which contact therebetween at a single point 50. It will be noted from an examination of Figure 3 that point 50 lies on a vertical axis taken through the center of the cam; in different angular positions of the cams the point contact therebetween remains at the same position with respect to the center "o" of the cam.

It is possible to adjustably position the friction element 14 by limiting the angular movement of the cam, thus maintaining the friction element in a selected vertical location (referring to Figure 3). A keyway 60 is formed in each of the flat sides 47 of the bearing. A key 62 is received in keyway 60 and is provided with a round boss 64 which extends into a circular recess 66 in the cam. A spring 68 is fitted over the round button 64 and engages the inner surface of the recess 66 thus resisting turning of the cam.

A U-shaped return spring 70 has legs 72 and 74 which connect with the friction elements 12 and 14, urging them together and away from contact with the sides of the rotor. A slight amount of lost motion is provided between the keyway 60 and the key 62 which permits turning of the cams thus allowing sufficient retraction of the friction elements from the sides of the rotor to prevent "drag."

After this free motion is taken up, the spring 68 resists further turning of the cam and thus maintains a selected angular position of the cam which defines a retracted position for the friction elements 12 and 14.

The operation of the device is believed to be clear from the foregoing description, however, a brief résumé of brake operation will next be given. Assuming that the rotor is turning counterclockwise the friction elements 12 and 14 will tend to shift with the rotor as they are engaged against the sides thereof by the levers 16. Shifting of the friction elements is transmitted through the camming devices to the friction element 24 which then pivots about pin 26 bringing the left hand lined rim against the cylindrical surface of the rotor. If the friction elements continue to shift circumferentially after the rim is applied, this causes the friction elements 12 and 14 to move relatively to the bearing 40. The friction elements push against the bosses 41 on the surfaces 58 thus exerting force on the cams 38. The cams are caused to turn on their respective axes and the cam surfaces 48 undergo rolling movement therebetween. As the cams are turned angularly, the shoulders 54 are lifted vertically, imparting oppositely directed thrust on elements 12 and 14 through the bushings 42.

When the brake is initially applied, the turning of cam 38 carries the boss 64 with it until the lost motion between key 62 and keyway 60 is taken up. After the lost motion between key 62 and keyway 60 is exceeded, then the button 64 is held fixed and further turning of the cam causes turning of the boss 64 in the recess 66. The spring 68 resists turning of the boss in the recess and new relative positions of the boss 64 and cam 38 are obtained by angular movement of the cam 38 in excess of that provided by the lost motion between key 62 and keyway 60. It will be noted that once the free motion between the key 62 and keyway 60 is taken up, then the cam can turn only against the frictional resistance of the spring 68 within the opening 66.

When the brake is released the return spring 70 forces the friction elements 12 and 14 together until the lost motion between the key 62 and keyway 60 is taken up in the opposite direction, whereupon further turning of the cams is prevented by the friction developed from the spring 68, thus maintaining new angular positions of the cams with respect to the button. The angular position of the cam determines the extent to which the friction elements are spread apart, and by controlling said cam position in the beforementioned manner, the "flat" shoes are adjusted.

It will be understood that the applying effort exerted by the cams remains substantially constant through the wear life of the friction elements. That is, the self-energization of the brake is relatively unaffected by lining wear.

Although the invention has been described with only a single embodiment there are numerous modifications which can be made without departing from the underlying principles of the invention. I intend therefore, to include within the scope of the following claims, all equivalent structure for obtaining the same or equivalent results.

I claim:

1. In a brake having a rotatable member, an arcuate first friction element, two spaced apart second friction elements which move in opposite directions to engage said rotatable member, a bearing mounted in said first friction element, two cams turnably mounted in said bearing and having bosses extending at opposite ends thereof into openings formed in said spaced apart second friction elements, said cams being in abutting relation with rolling contact therebetween, the centers of rotation and the point of contact between said cams being colinearly located for all angular positions of said cams, and shoulders on said cams abutting with said spaced apart friction elements to effect displacement theerof responsively to cam turning which is produced by relative movement between the bearings and said second friction elements, the surfaces of said shoulders and bosses of said cams being curved with the centers of curvature located on perpendicular axes intersecting at the centers of rotation of said cams, and means in combination with each of said cams for yieldably resisting turning thereof, said means including a keyway in opposite sides of said bearing, a key received in each of said keyways and extending into a recess in opposite sides of said cam and means yieldably resisting turning of the key within the recess of the cam to maintain selected angular positions for said cam.

2. A friction element actuating mechanism comprising a cam, means for mounting said cam to provide for turning thereof, said cam having a first cam surface engageable with the friction element whereby transverse friction element movement is translated into turning of said cam, said cam being further provided with a second cam surface engageable with the friction element to impart thrust thereto responsively to cam turning, said first and second cam surfaces having their centers of curvature located on perpendicular axes intersecting at the center of said cam so that transverse movement of the friction element producing turning of the cam produces proportional thrust thereon for all increments of cam turning.

3. In a brake, a friction-producing element, a cam, means for mounting said cam to provide for turning thereof, said cam being inclusive of first and second curved cam surfaces which are operatively associated with said friction-producing element, said first cam surface being arranged to translate transverse shifting of said friction element to turning of said cam, said second cam surface being arranged to effect movement of said friction element toward an applied position responsively to turning of said cam, said first and second cam surfaces being curved with the centers of curvatures located on perpendicular axes intersecting at the center of turning of said cam so that movement of said friction element toward an applied position is substantially constantly proportional to transverse movement of said friction element.

4. An actuator for a friction element comprising a cam, means for turnably mounting said cam, said cam being inclusive of curved cam surfaces operatively associated with spaced portions of said friction element, the centers of curvature of said cam surfaces being located on perpendicular axes intersecting at the center of said cam in order that transverse movement of the friction element is translated into substantially proportionate applying movement for all degrees of transverse movement.

5. A cam for defining the applying movement of a friction element, said cam comprising two transverse distinct and curved cam surfaces, means for turnably mounting said cam, one of said cam surfaces translating transverse movement of the friction element into turning of said cam, the other of said cam surfaces translating turning of the cam to applying movement of said friction element, and means operatively associated with said cam for maintaining attained angular positions of said cam to fix the location of said friction element.

6. A cam for use in conjunction with an axially applied friction element, said cam comprising two flat sides and two rounded sides which limit movement of said cam to turning in one plane only, a boss located on one end of said cam and having a curved surface engageable with said friction element so that transverse movement of said friction element produces turning of said cam, and a shoulder formed from a curved surface of said cam, said shoulder being so constructed to exert a lifting force on said friction element when the cam is caused to turn the centers of curvature of said shoulder and boss being located on perpendicular axes intersecting at the center of the cam so that energization of the friction element remains substantially constant throughout the wear life thereof.

7. An actuating device for two oppositely acting spaced apart friction elements which are spread by said actuating device responsively to relative movement between said actuating device and friction elements, said device including a bearing having two flat parallel spaced apart surfaces, a pair of cams received in end to end relation in said bearing, each of said cams having flats on opposite sides which contact the flat surfaces of said bearing to limit turning of each of said cams to a single axis, bosses formed on the remote ends of said cams, said bosses having curved surfaces extending into contact with said friction elements, rounded abutting surfaces on said cams permitting rolling movement between said cams with a point of contact therebetween, the centers of rotation and the point of contact between said cams being collinearly located for all angular positions of said cams, shoulders formed on the remote ends of said cams, each of said shoulders having a curved surface, the curved surfaces on said shoulders and boss of each of said cams being formed with the centers of curvature located on perpendicular axes intersecting at the center of rotation of said cam to impart thrust to the friction element as the cam turns in said bearing.

8. An actuator for two friction elements which are axially spread apart in brake operation, said actuator comprising a bearing which is fixable relatively to said friction elements, two cams mounted in end to end relation in said bearings, said cams and bearing having correspondingly flat and rounded surfaces which permit turning each of said cams within said bearing about a single axis, said cams being further provided with rounded engageable surfaces permitting rolling contact therebetween, bosses having curved surfaces formed on the remote ends of said cams, said bosses extending into engagement with the friction elements in such a way that transverse movement of the friction elements relative to said bearing causes turning of said cams, said cams being further provided with rounded shoulders at their remote ends, said shoulders being engageable with and arranged to effect axial displacement of said friction elements, the centers of curvature of the curved surfaces of said shoulders and bosses being located on perpendicular axes respectively intersecting at the centers of rotation of said cams.

9. An actuating device for friction elements of a brake which are spread apart to apply the brake, said actuating device including a bearing, two cams which are mounted in end to end relation within said bearing for turning therein, rounded surfaces of engagement between said cams providing rolling movement therebetween, bosses having curved surfaces formed on the remote ends of said cams, said bosses extending into engagement with the friction elements whereby transverse movement of friction elements relative to said bearing produces turning of said cams, said cams having curved surfaces engageable with said friction elements to impart oppositely directed thrust thereto upon turning of said cams, the curved surfaces of said cams bearing against the friction elements and the curved surfaces of said bosses each having their centers of curvature located on perpendicular axes which intersect at the centers of rotation of said cams so that displacement of the friction elements is proportional to cam turning during all increments of cam turning.

10. An actuator for applying a friction-producing element comprising a cam, means for mounting said cam to provide for turning thereof, said cam being inclusive of two curved cam surfaces operatively associated with the friction element so that transverse shifting of the friction element produces turning of said cam in such a way that applying thrust is exerted to the friction element, said curved cam surfaces having their centers of curvature located on perpendicular axes intersecting at the center of said cam so that movement of the friction element toward an applied position is substantially constantly proportional to the transverse movement of the friction element producing turning of said cam.

11. A combination friction element actuator and brake adjustor comprising a bearing provided with an opening having two flat parallel surfaces therein, a keyway formed in one of said flat surfaces, a key received in said keyway, a cam having two flat sides mounted for turning about a single axis in said bearing, an opening in one of the flat sides of said cam, said cam having curved cam surfaces arranged to translate movement of the friction element in one direction into substantially constantly proportional applying movement in another direction, said key being fitted into the opening in said cam and arranged in a manner permitting relative turning movement therebetween, and means for yieldably resisting relative turning movement between said key and cam in such a way to maintain attained angular positions of said cam thereby positioning the friction element.

References Cited in the file of this patent

UNITED STATES PATENTS 2,256,725     Pierce et al. _____ Sept. 23, 1941